United States Patent
Conroy et al.

(10) Patent No.: US 6,990,634 B2
(45) Date of Patent: Jan. 24, 2006

(54) METHOD OF SUMMARIZING TEXT BY SENTENCE EXTRACTION

(75) Inventors: John M. Conroy, Laurel, MD (US); Dianne P. O'Leary, Wheaton, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 306 days.

(21) Appl. No.: 10/135,100

(22) Filed: Apr. 26, 2002

(65) Prior Publication Data

US 2002/0174149 A1 Nov. 21, 2002

Related U.S. Application Data

(60) Provisional application No. 60/287,231, filed on Apr. 27, 2001.

(51) Int. Cl.
*G06F 15/00* (2006.01)
(52) U.S. Cl. .................. 715/531; 715/531; 704/1; 704/9
(58) Field of Classification Search ............... 715/531; 704/1, 9
See application file for complete search history.

(56) References Cited

U.S. PATENT DOCUMENTS

| 5,384,703 A | 1/1995 | Withgott et al. |
| 5,638,543 A | 6/1997 | Pedersen et al. |
| 5,924,108 A | 7/1999 | Fein et al. |
| 5,978,820 A | 11/1999 | Mase et al. |
| 6,172,675 B1 * | 1/2001 | Ahmad et al. ........... 715/500.1 |
| 6,205,456 B1 | 3/2001 | Nakao |
| 6,289,304 B1 | 9/2001 | Grefenstette |
| 6,338,034 B1 | 1/2002 | Ishikawa et al. |
| 6,349,316 B2 | 2/2002 | Fein et al. |
| 2002/0052730 A1 * | 5/2002 | Nakao .................... 704/10 |
| 2003/0004996 A1 * | 1/2003 | Novaes .................. 707/513 |
| 2004/0078188 A1 * | 4/2004 | Gibbon et al. ............. 704/1 |
| 2004/0107088 A1 * | 6/2004 | Budzinski ................ 704/10 |

* cited by examiner

*Primary Examiner*—Stephen Hong
*Assistant Examiner*—Thu V. Huynh
(74) *Attorney, Agent, or Firm*—Robert D. Morelli

(57) ABSTRACT

A method of summarizing text. The sentences in the text are identified first. Then, the terms in each sentence are identified. A matrix is then generated, where the columns represent the sentences and the rows represent the terms. The entries in the matrix are weighted with an exponentially decaying function or a Hidden Markov Model. The Euclidean length of each column is determined. The sentence corresponding to the column having the maximum Euclidean length is selected as a summary sentence. The columns corresponding to the remaining sentences have their matrix entries reduced. If additional summary sentences are desired then return to the step of determining Euclidean length of the columns.

7 Claims, 4 Drawing Sheets

METHOD OF SUMMARIZING TEXT BY SENTENCE EXTRACTION

This application claims the benefit of U.S. Provisional Application No. 60/287,231, filed Apr. 27, 2001.

FIELD OF THE INVENTION

The present invention relates, in general, to data processing and, in particular, to document processing of text.

BACKGROUND OF THE INVENTION

The field of automatically summarizing text consisting of a collection of sentences has been studied for over forty years. However, automatic text summarization has received greater attention recently because of its pervasive use in present information retrieval systems. One type of text summarization method consists of extracting a number of sentences from the text that convey the essential points of the text. The number of sentences extracted from a text may be few to present only enough information to allow a user to determine whether or not to read the entire text or many to act as a substitute for the text.

U.S. Pat. No. 5,384,703, entitled "METHOD AND APPARATUS FOR SUMMARIZING DOCUMENTS ACCORDING TO THEME," discloses a device for and method of summarizing a document that includes the step of selecting regions in the document based on the occurrence of two or more members from a seed list. The present invention does not use a seed list as in U.S. Pat. No. 5,384,703. U.S. Pat. No. 5,384,703 is hereby incorporated by reference into the specification of the present invention.

U.S. Pat. No. 5,638,543, entitled "METHOD AND APPARATUS FOR AUTOMATIC DOCUMENT SUMMARIZATION," discloses a device for and method of summarizing a document that includes the step of scoring sentences based on the number of stop words and strings of connected stop words. The present invention does not score sentences based on the number of stop words and strings of stop words as in U.S. Pat. No. 5,638,543. U.S. Pat. No. 5,638,543 is hereby incorporated by reference into the specification of the present invention.

U.S. Pat. Nos. 5,924,108 and 6,349,316, each entitled "DOCUMENT SUMMARIZER FOR WORD PROCESSORS," each disclose a method of summarizing a document that includes the step of scoring sentences by summing the frequency counts of content words in a sentence divided by the total number of content words in the sentence. The present invention does not score sentences as in U.S. Pat. Nos. 5,924,108 and 6,349,316. U.S. Pat. Nos. 5,924,108 and 6,349,316 are hereby incorporated by reference into the specification of the present invention.

U.S. Pat. No. 5,978,820, entitled "TEXT SUMMARIZING METHOD AND SYSTEM," discloses a device for and method of summarizing a document that includes the step of determining a number of attributes of the text such as the number of characters, the number of paragraphs, a specific character string, the frequency of occurrence of opinion sentences, imperative sentences, polite sentences, conversational sentences, and colloquial sentences. The present invention does not determine attributes as in U.S. Pat. No. 5,978,820. U.S. Pat. No. 5,978,820 is hereby incorporated by reference into the specification of the present invention.

U.S. Pat. No. 6,205,456, entitled "SUMMARIZATION APPARATUS AND METHOD," discloses a device for and method of summarizing a document that requires input from the user concerning the user's focus and knowledge. The present invention does not require input from the user concerning the user's focus and knowledge as in U.S. Pat. No. 6,205,456. U.S. Pat. No. 6,205,456 is hereby incorporated by reference into the specification of the present invention.

U.S. Pat. No. 6,289,304, entitled "TEXT SUMMARIZATION USING PART-OF-SPEECH," discloses a method of summarizing text that includes the step of identifying the part-of-speech of each word in the text. The present invention does not identify the part-of-speech of each word in the text as in U.S. Pat. No. 6,289,304. U.S. Pat. No. 6,289,304 is hereby incorporated by reference into the specification of the present invention.

U.S. Pat. No. 6,338,034, entitled "METHOD, APPARATUS, AND COMPUTER PROGRAM PRODUCT FOR GENERATING A SUMMARY OF A DOCUMENT BASED ON COMMON EXPRESSIONS APPEARING IN THE DOCUMENT," discloses a device for and method of summarizing a document that includes the step of looking up common expression information. The present invention does not use look up common expression information as in U.S. Pat. No. 6,338,034. U.S. Pat. No. 6,338,034 is hereby incorporated by reference into the specification of the present invention.

SUMMARY OF THE INVENTION

It is an object of the present invention to summarize a text by selecting at least one sentence from the text as the summary.

It is another object of the present invention to summarize text by weighting the frequency of occurrence of each term in the text with a user-definable decaying exponential function.

It is another object of the present invention to summarize text by weighting the frequency of occurrence of each term in the text using Hidden Markov Model and a Markov state space diagram having 2s+1 states, with s summary states and s+1 non-summary states.

The present invention is a method of summarizing text by selecting at least one sentence from the text as a summary. The first step of the method is identifying each sentence in the text.

The second step of the method is identifying each term in each sentence.

The third step of the method is generating a matrix, where each column in the matrix represents a sentence and each row represents a term.

The fourth step of the method is replacing each entry in the matrix by a product of the matrix entry and a user-definable function that decays exponentially.

The fifth step of the method is determining the Euclidean length of each column in the matrix.

The sixth step of the method is selecting the column with a maximum Euclidean length as a summary sentence.

The seventh step of the method is reducing the Euclidean lengths of the unselected columns in the matrix.

The eighth step of the method is returning to the fifth step if another summary sentence is desired. Otherwise, returning the selected summary sentences as the summary of the text.

DETAILED DESCRIPTION

Figure 1:
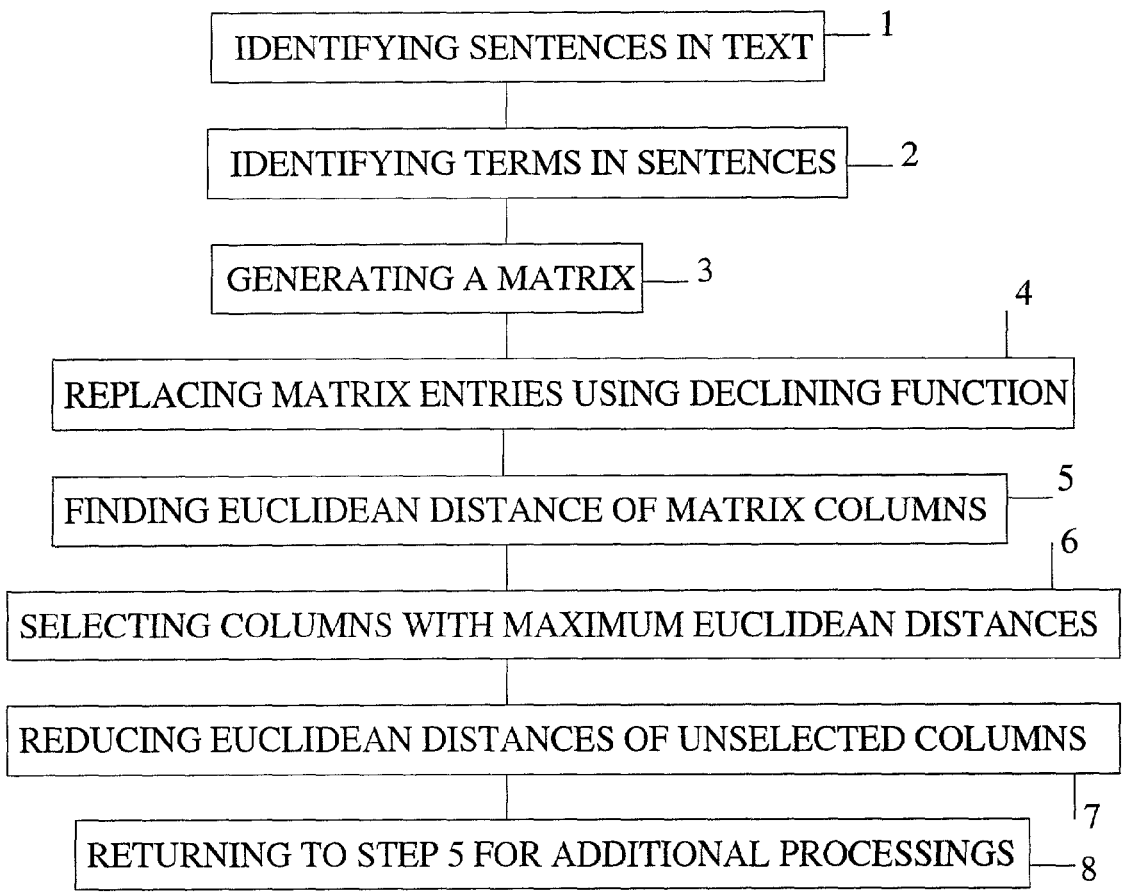
FIG. 1 is a list of steps of the present invention.

The present invention is a method of summarizing text by extracting sentences from the text that, most probably, summarize the text. FIG. 1 is a list of steps of the present method. The first step 1 of the method is identifying each sentence in the text.

The second step 2 of the method is identifying each term in each sentence. The identification of each term in each sentence may be done after stop-words are eliminated from the text and any term ambiguity is resolved.

The third step 3 of the method is generating a matrix, where each column in the matrix represents a sentence in the text, and where each row in the matrix represents a term in the text. Each entry in the matrix may be the value one or the frequency of occurrence of the corresponding term in the corresponding sentence.

The fourth step 4 of the method is replacing each entry in the matrix by a product of the matrix entry and a user-definable function that decays exponentially. One method of replacing each entry in the matrix by a product of the matrix entry and a user-definable function that decays exponentially includes replacing each entry in the matrix by a product of the matrix entry and $ge^{(-8j/n)}+t$, where g is a user-definable constant, where $e \sim 2.718$, where j is the column number of the column in question, where n is the number of sentences in the text, and where t is a user-definable constant that makes the decaying function's length approximately equal to the decaying function's height.

The fifth step 5 of the method is determining the Euclidean length of each column. Euclidean length of a column is determined by squaring the entries in the column, summing the squares, and taking the square root of the sum.

The sixth step 6 of the method is selecting the column with a maximum Euclidean length as a summary sentence.

The seventh step 7 of the method is reducing the Euclidean lengths of the columns not selected in the sixth step 6. One method of reducing Euclidean length includes subtracting $r_{ji}q_i$ from each entry in the columns not selected in the sixth step 6, where $r_{ji}=a_j^T q_i$, where $a_j^T$ is the transpose of the column in question prior to reducing the entries therein, where $q_i=a_s/\|a_s\|$, where $a_s$ is the column selected in the sixth step 6, and where $\|a_s\|$ is the Euclidean length of column $a_s$.

The eighth step 8 of the method is returning to the fifth step 5 if another summary sentence is desired. Otherwise, returning the selected summary sentences as the summary of the text.

The fifth step 5 through the eighth step 8 describe a matrix decomposition method which is commonly referred to as a QR decomposition. Other matrix decomposition methods may be employed in the present invention such as the Gaussian Elimination with Column Pivoting method (commonly referred to as the LUP method), the bidiagonalization method (commonly referred to as the UBV method), the orthogonal factorization method (commonly referred to as the ULV method), the singular value decomposition method (commonly referred to as the USV method), the eigenvalue decomposition method (commonly referred to as the VSV method), and any other suitable matrix decomposition method.

Figure 2:
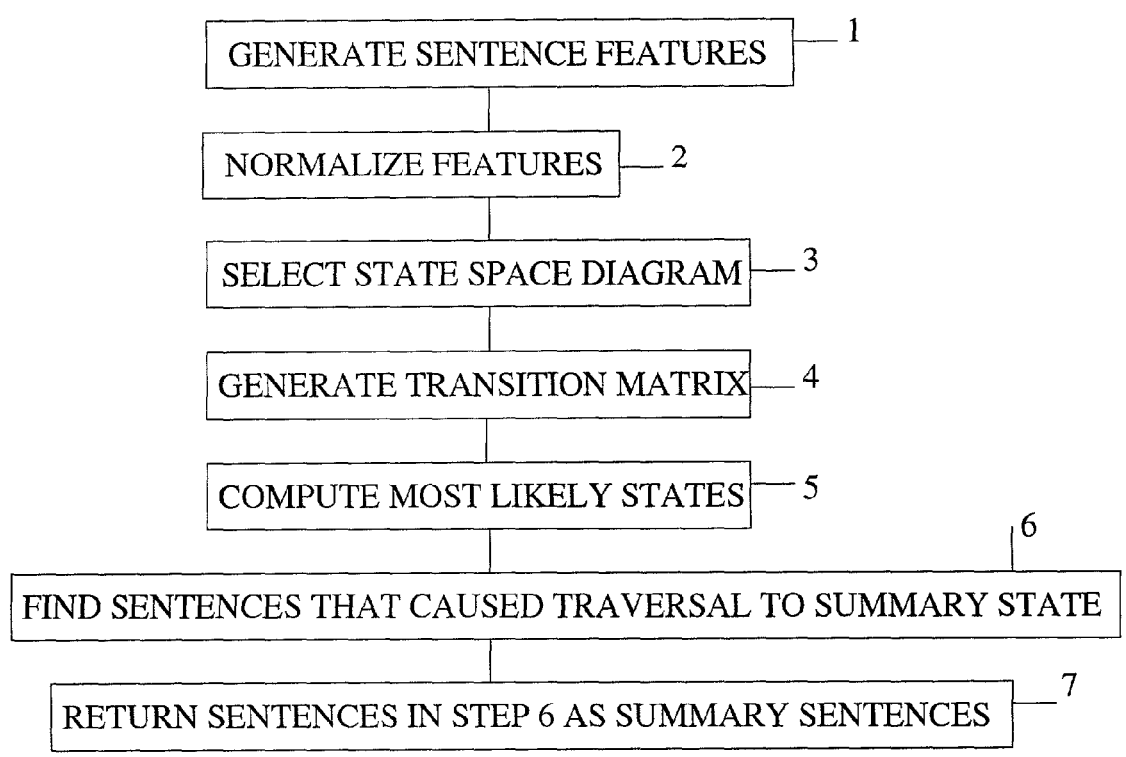
FIG. 2 is a list of steps of a first alternate embodiment of the present invention.

FIG. 2 is a list of steps of a first alternative embodiment of the present invention. The first alternative embodiment includes a state space diagram and a Hidden Markov Model. The first step 21 of the first alternative embodiment is generating a user-definable number of features for each sentence in the text. The features for each sentence include a user-definable value assigned to the sentence in question based on the position of the sentence in a paragraph ol(i), where ol(i)=1 if the sentence is the first sentence in the paragraph, where ol(i)=2 if the sentence is between the first sentence and the last sentence in the paragraph, and where ol(i)=3 if the sentence is the sentence in the paragraph. In an alternate embodiment, ol(i) represent the position of a paragraph in the text.

The features of each sentence also includes a value consisting of a log(number of terms in the sentence in question +1), $$o2(i)=\log(n+1),$$

where n is the number of terms in the sentence, $$o3(i) = \sum_{j \in s_i} \log\left(\frac{b_j}{\sum_{k \in D} b_k}\right),$$

where $b_j$ is the frequency of occurrence of term j in a set of baseline documents, and where $b_k$ is the frequency of occurrence of term k in the baseline documents, where the outer summation is over all terms j which occur in the i-th sentence ($s_i$), and $$o4(i) = \sum_{j \in s_i} \log\left(\frac{d_j}{\sum_{k \in D} b_k}\right),$$

where $d_j$ is the frequency of occurrence of term j in the text D, and where $b_k$ is the frequency of occurrence of term k in the text D.

The second step 22 of the first alternative embodiment is normalizing features ol(i), o2(i), o3(i) and o4(i) each by subtracting its mean and dividing the remainder by its corresponding standard deviation.

The third step 23 of the first alternative embodiment is selecting a Markov state space diagram having 2s+1 states, with s summary states and s+1 non-summary states.

The fourth step 24 of the first alternative embodiment is generating a Hidden Markov transition matrix. Data used to generate the Hidden Markov transition matrix includes marked data, blind data, and user-definable data.

The fifth step 25 of the first alternative embodiment is computing a most likely set of states of, or path through, the Markov state space diagram. The Markov state space diagram may be traversed using known state space traversal methods such as forward-backward recursion and the Viterbi method.

The sixth step 26 of the first alternative embodiment is identifying those sentences in the text that caused a traversal to a summary state in the Markov state space diagram.

The seventh step 27 of the first alternative embodiment is returning those sentences identified in the sixth step 26 as the summary of the text.

Figure 3:
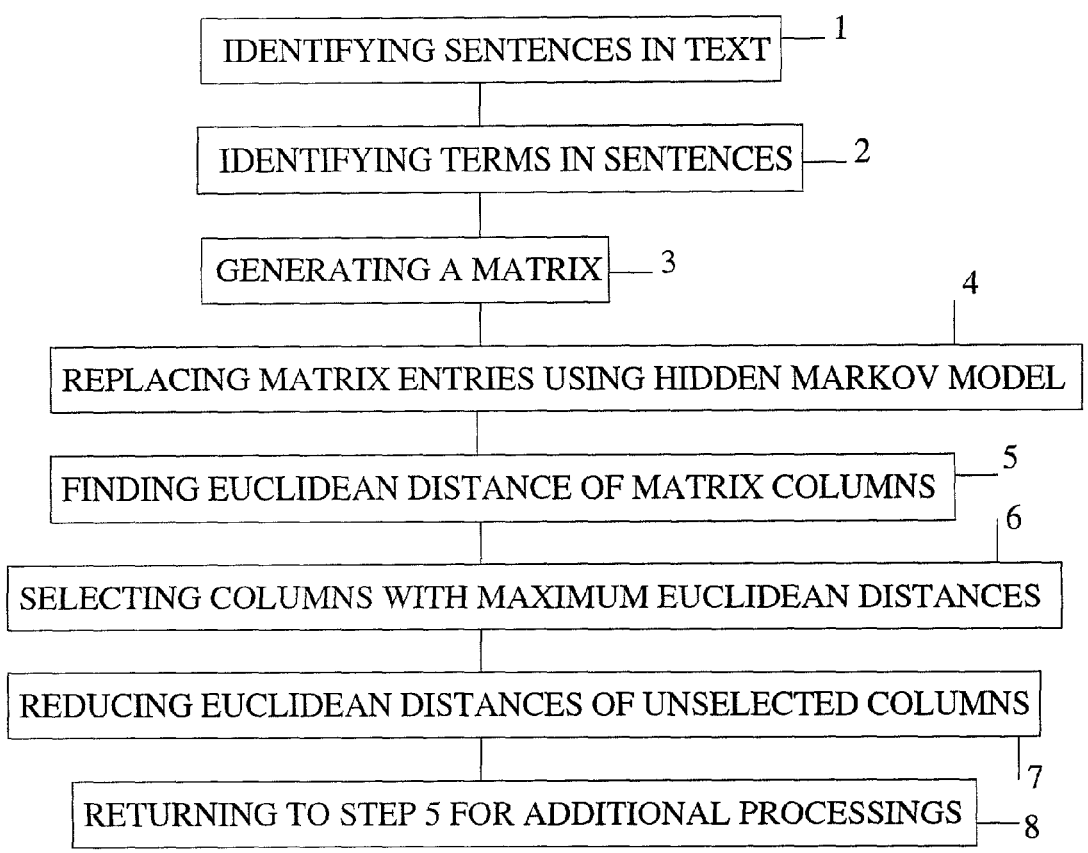
FIG. 3 is a list of steps of a second alternate embodiment of the present invention.

FIG. 3 is a list of steps of the second alternative embodiment of the present invention. The second alternative embodiment is a combination of the first embodiment of FIG. 1 and the first alternative embodiment of FIG. 2. The first step 31 of the second alternative embodiment is identifying each sentence in the text.

The second step 32 of the second alternative embodiment is identifying each term in each sentence.

The third step 33 of the second alternative embodiment is generating a matrix, where each column in the matrix represents a sentence in the text, and where each row in the matrix represents a term in the text.

The fourth step 34 of the second alternative embodiment is replacing each entry in the matrix by a product of the matrix entry and a Hidden Markov Model probability that the sentence corresponding to the matrix entry is a summary sentence.

The fifth step 35 of the second alternative embodiment is determining the Euclidean length of each column.

The sixth step 36 of the second alternative embodiment is selecting the column with the maximum Euclidean length as a summary sentence.

The seventh step 37 of the second alternative embodiment is reducing the Euclidean lengths of the columns not selected in the sixth step 36.

The eighth step 38 of the second alternative embodiment is returning to the fifth step 35 if another summary sentence is desired. Otherwise, returning the selected summary sentences as the summary of the text.

Figure 4:
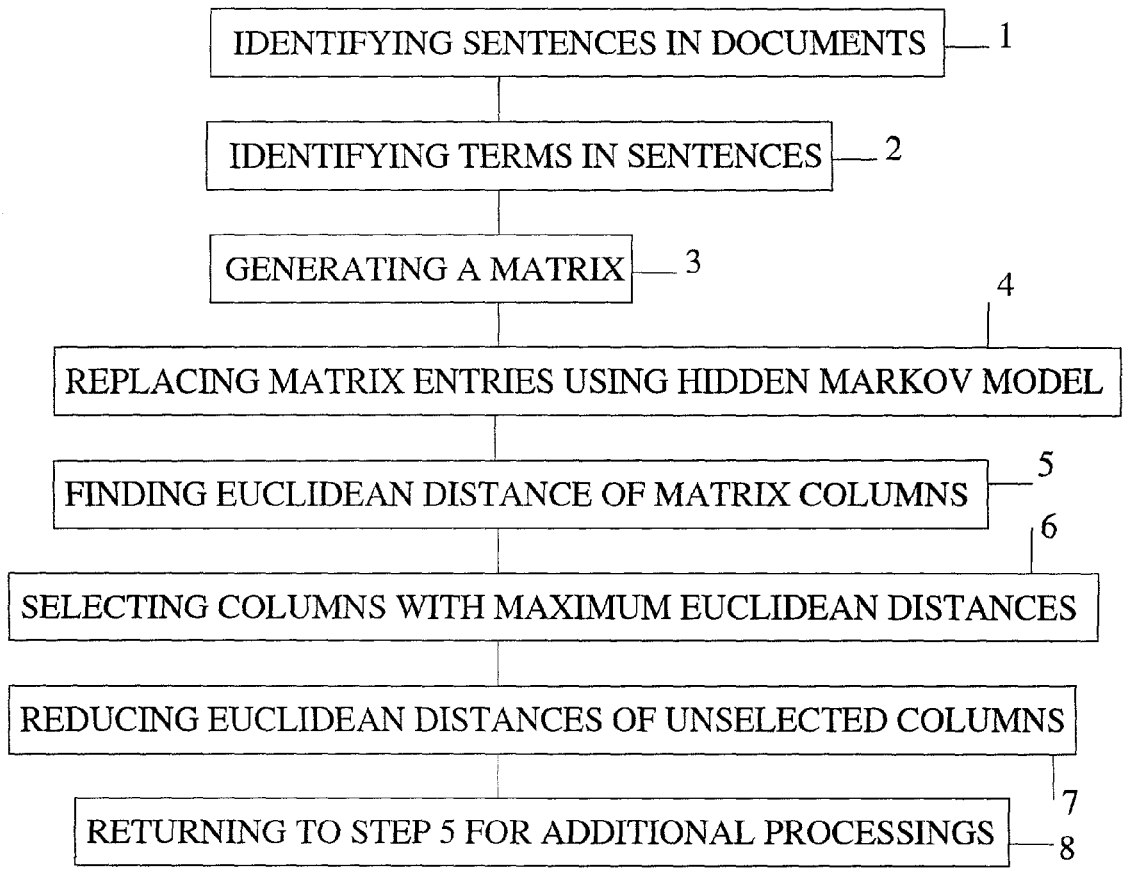
FIG. 4 is a list of steps of a third alternate embodiment of the present invention.

FIG. 4 is a list of steps of a third alternative embodiment of the present invention. The third alternative embodiment is the second alternative embodiment of FIG. 3 with additional steps to allow for the processing of multiple documents at the same time. The first step 41 of the third alternate embodiment is identifying each sentence in a user-definable number of documents.

The second step 42 of the third alternative embodiment is identifying each term in each sentence in each document.

The third step 43 of the third alternative embodiment is generating a matrix, where each column in the matrix represents a sentence in the documents, and where each row in the matrix represents a term in the documents.

The fourth step 44 of the third alternative embodiment is replacing each entry in the matrix by a product of the matrix entry and a Hidden Markov Model probability that the sentence corresponding to the matrix entry is a summary sentence.

The fifth step 45 of the third alternative embodiment is determining the Euclidean length of each column.

The sixth step 46 of the third alternative embodiment is selecting the column with a maximum Euclidean length as a summary sentence.

The seventh step 47 of the third alternative embodiment is reducing the Euclidean lengths of the columns not selected in the sixth step 46.

The eighth step 48 of the third alternative embodiment is returning to the fifth step 45 if another summary sentence is desired. Otherwise, returning the selected summary sentences as the summary of the text.

What is claimed is:

1. A method of summarizing text on a computer, where the text consists of a number of sentences, and where each sentence includes a number of terms, comprising the steps of:
   (a) identifying each sentence in the text;
   (b) identifying each term in each sentence;
   (c) generating a matrix on the computer, where each column in the matrix represents a sentence in the text, and where each row in the matrix represents a term in the text;
   (d) replacing each entry in the matrix by a product of the matrix entry and a user-definable function that decays exponentially;
   (e) determining the Euclidean length of each column by squaring the entries in the corresponding column, summing the squares, and taking the square root of the sum;
   (f) selecting the column with a maximum Euclidean length as a summary sentence;
   (g) reducing the Euclidean lengths of the columns not selected in step (f); and
   (h) returning to step(e) if another summary sentence is desired, otherwise returning the selected summary sentences as the summary of the text.

2. The method of claim 1, wherein said step of identifying each term in each sentence is comprised of the step of identifying each term in each sentence after stop-words are eliminated and any term ambiguity is resolved.

3. The method of claim 1, wherein said step of generating a matrix on the computer is comprised of the step of generating a matrix on the computer where each entry in the matrix is selected from the group of matrix entries comprising one and the frequency of occurrence of a particular term in a particular sentence.

4. The method of claim 1, wherein said step of replacing each entry in the matrix by a product of the matrix entry and a user-definable function that decays exponentially is comprised of the step of replacing each entry in the matrix by a product of the matrix entry and $ge^{(-8j/n)}+t$, where g is a user-definable constant, where $e\sim2.718$, where j is the column number of the column in question, where n is the number of sentences in the text, and where t is a user-definable constant that makes the decaying function's length approximately equal to the decaying function's height.

5. The method of claim 1, wherein said step of reducing the Euclidean lengths of the columns not selected in step (f) is comprised of the step of subtracting $r_{ji}q_i$, from each entry in the columns not selected in step (f), where $r_{ji}=a_j^T q_i$, where $a_j^T$ the transpose of the column in question prior to reducing the entries therein, where $q_i=a_s/\|a_s\|$, where $a_s$, is the column selected in step (f), and where $\|a_s\|$ is the Eucidean length of column $a_s$.

6. A method of summarizing text on a computer, where the text consists of a number of sentences, and where each sentence includes a number of terms, comprising the steps of:
   (a) identifying each sentence in the text;
   (b) identifying each term in each sentence;
   (c) generating a matrix on the computer, where each column in the matrix represents a sentence in the text, and where each row in the matrix represents a term in the text;
   (d) replacing each entry in the matrix by a product of the matrix entry and a Hidden Markov Model probability that the sentence corresponding to the matrix entry is a summary sentence;
   (e) determining the Eudidean length of each column by squaring the entries in the column in question, summing the squares, and taking the square root of the sum;
   (f) selecting the column with the maximum Euclidean length as a summary sentence;
   (g) reducing the Eucidean lengths of the columns not selected in step (f); and (h) returning to step(e) if another summery sentence is desired, otherwise returning the selected summary sentences as the summary of the text.

7. A method of summarizing a plurality of documents on a computer, where each document consists of a number of sentences, and where each sentence includes a number of terms, comprising the steps of:
  (a) identifying each sentence in each document from the plurality of documents;
  (b) identifying each term in said each sentence;
  (c) generating a matrix on the computer, where each column in the matrix represents a sentence in the plurality of text, and where each row in the matrix represents a term in the plurality of text;
  (d) replacing each entry in the matrix by a product of the matrix entry and a Hidden Markov Model probability that the sentence corresponding to the matrix entry is a summary sentence;
  (e) determining the Euclidean length of each column by squaring the entries in the corresponding column, summing the squares, and taking the square root of the sum;
  (f) selecting the column with a maximum Euclidean length as a summary sentence;
  (g) reducing the Euclidean lengths of the columns not selected in step (f); and
  (h) returning to step(e) if another summary sentence is desired, otherwise returning the selected summary sentences as the summary of the text.

* * * * *